(12) United States Patent
Cunha et al.

(10) Patent No.: US 10,968,829 B2
(45) Date of Patent: *Apr. 6, 2021

(54) COOLING AN IGNITER BODY OF A COMBUSTOR WALL

(71) Applicant: Raytheon Technologies Corporation, Farmington, CT (US)

(72) Inventors: Frank J. Cunha, Avon, CT (US); Stanislav Kostka, Jr., Northbridge, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 727 days.

This patent is subject to a terminal disclaimer.

(21) Appl. No.: 15/100,363

(22) PCT Filed: Dec. 4, 2014

(86) PCT No.: PCT/US2014/068599
§ 371 (c)(1),
(2) Date: May 31, 2016

(87) PCT Pub. No.: WO2015/085080
PCT Pub. Date: Jun. 11, 2015

(65) Prior Publication Data
US 2016/0305325 A1 Oct. 20, 2016

Related U.S. Application Data

(60) Provisional application No. 61/912,993, filed on Dec. 6, 2013.

(51) Int. Cl.
*F02C 7/18* (2006.01)
*F23R 3/00* (2006.01)
(Continued)

(52) U.S. Cl.
CPC ............... *F02C 7/18* (2013.01); *F02C 7/264* (2013.01); *F02C 7/266* (2013.01); *F23R 3/005* (2013.01);
(Continued)

(58) Field of Classification Search
CPC .. F23R 3/002; F23R 3/06; F23R 2900/03044; F23R 2900/03041; F23R 3/02;
(Continued)

(56) References Cited

U.S. PATENT DOCUMENTS 4,265,085 A 5/1981 Fox et al.
5,461,866 A 10/1995 Sullivan et al.
(Continued)

FOREIGN PATENT DOCUMENTS

GB 2017827 A 10/1979
GB 2353589 A 2/2001

OTHER PUBLICATIONS

EP search report for EP14868231.3 dated Mar. 2, 2017.

*Primary Examiner* — Ehud Gartenberg
*Assistant Examiner* — Jacek Lisowski
(74) *Attorney, Agent, or Firm* — Getz Balich LLC

(57) ABSTRACT

An assembly is provided for a turbine engine. This turbine engine assembly includes a combustor wall. The combustor wall includes a shell, a heat shield and an annular body. The body extends laterally between an inner surface and an outer surface. The inner surface defines an igniter aperture in the combustor wall. The outer surface is vertically between the heat shield and the shell. The shell defines a first cooling aperture through which air is directed to impinge against the outer surface.

2 Claims, 17 Drawing Sheets

(51) Int. Cl.
  *F23R 3/06* (2006.01)
  *F23R 3/50* (2006.01)
  *F02C 7/266* (2006.01)
  *F02C 7/264* (2006.01)

(52) U.S. Cl.
  CPC .......... *F23R 3/06* (2013.01); *F23R 3/50* (2013.01); *F05D 2260/20* (2013.01); *F23R 2900/03041* (2013.01); *F23R 2900/03042* (2013.01); *F23R 2900/03043* (2013.01); *F23R 2900/03044* (2013.01); *F23R 2900/03045* (2013.01)

(58) Field of Classification Search
  CPC .... F23R 3/42; F23R 3/425; F23R 3/46; F23R 3/48; F23R 3/60; F23R 3/007; F23R 3/08; F23R 3/16; F23R 3/26; F23R 2207/00; F23R 2900/00012; Y02T 50/675; F02K 9/95; F05D 2260/201; F05D 2260/99; F02C 7/66; F02C 7/28
  USPC .......................... 60/752, 754, 772, 267, 806
  See application file for complete search history.

(56) References Cited

U.S. PATENT DOCUMENTS

| | | |
|---|---|---|
| 5,758,503 A | 6/1998 | DuBell et al. |
| 5,865,030 A | 2/1999 | Matsuhama |
| 7,093,441 B2 | 8/2006 | Burd et al. |
| 7,146,815 B2 | 12/2006 | Burd |
| 8,443,610 B2 | 5/2013 | Hoke et al. |
| 8,646,276 B2 * | 2/2014 | Davis, Jr. ............... F23R 3/005 60/752 |
| 8,726,631 B2 * | 5/2014 | Rudrapatna ............. F23R 3/02 60/772 |
| 8,739,546 B2 * | 6/2014 | Snyder ..................... F23R 3/06 60/752 |
| 2001/0004835 A1 * | 6/2001 | Alkabie ................... F23R 3/04 60/757 |
| 2004/0104538 A1 | 6/2004 | Pidcock et al. |
| 2009/0064657 A1 | 3/2009 | Lupanc et al. |
| 2010/0095679 A1 | 4/2010 | Rudrapatna et al. |
| 2010/0122537 A1 | 5/2010 | Yankowich et al. |
| 2010/0212324 A1 * | 8/2010 | Bronson ................ F02C 7/264 60/752 |
| 2010/0287941 A1 | 11/2010 | Kim et al. |
| 2011/0048024 A1 | 3/2011 | Snyder et al. |
| 2011/0120132 A1 * | 5/2011 | Rudrapatna ............ F02C 7/264 60/752 |
| 2011/0185735 A1 | 8/2011 | Snyder |
| 2012/0297785 A1 * | 11/2012 | Melton .................... F23R 3/02 60/772 |
| 2013/0025288 A1 | 1/2013 | Cunha et al. |
| 2014/0020393 A1 * | 1/2014 | Nakamata .............. F23R 3/002 60/754 |
| 2014/0190171 A1 * | 7/2014 | Critchley ............... F23R 3/005 60/755 |
| 2015/0135719 A1 * | 5/2015 | Gerendas ............... F23R 3/002 60/752 |

* cited by examiner

COOLING AN IGNITER BODY OF A COMBUSTOR WALL

This application claims priority to PCT Patent Application No. PCT/US14/068599 filed Dec. 4, 2014 which claims priority to U.S. Patent Application No. 61/912,993 filed Dec. 6, 2013, which are hereby incorporated herein by reference in their entireties.

BACKGROUND OF THE INVENTION

1. Technical Field

This disclosure relates generally to a turbine engine and, more particularly, to a combustor of a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall includes a shell and a heat shield that defines a respective radial side of a combustion chamber. Cooling cavities extend radially between the heat shield and the shell. These cooling cavities fluidly couple impingement apertures defined in the shell with effusion apertures defined in the heat shield.

Each combustor wall may also include a plurality of igniter aperture grommets located between the shell and the heat shield. Each of the igniter aperture grommets defines an igniter aperture radially through the combustor wall that receives an igniter. The igniter aperture grommets as well as adjacent portions of the heat shield are typically subject to relatively high temperatures during engine operation, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. This turbine engine assembly includes a combustor wall. The combustor wall includes a shell, a heat shield and an annular body. The body extends laterally between an inner surface and an outer surface. The inner surface defines an igniter aperture in the combustor wall. The outer surface is vertically between the heat shield and the shell. The shell defines a first cooling aperture through which air is directed to impinge against the outer surface.

According to another aspect of the invention, an assembly is provided for a turbine engine. This turbine engine assembly includes an igniter, a combustor wall and a mount. The combustor wall includes a shell, a heat shield attached to the shell, and an annular body extending vertically between the shell and the heat shield. The body defines an igniter aperture in the combustor wall for receiving the igniter. A funnel-shaped portion of the shell extends around the body and defines a cooling aperture that is fluidly coupled with a cooling cavity vertically between the shell and the heat shield. The mount mounts the igniter to the combustor wall.

According to another aspect of the invention, a combustor wall is provided for a turbine engine with an igniter. The combustor wall includes a shell, a heat shield attached to the shell, and an annular body extending vertically between the shell and the heat shield. The body defines an igniter aperture in the combustor wall for receiving the igniter. The shell defines a cooling aperture that extends along an axis with a trajectory to the body. The cooling aperture is fluidly coupled with a cooling cavity vertically between the shell and the heat shield.

The funnel-shaped portion of the shell may be adapted to direct air through the cooling aperture and into the cooling cavity to impinge against the body.

A portion of the shell may be non-parallel with an opposing portion of the heat shield. The portion of the shell may define the cooling aperture.

An igniter may extend vertically into or through the igniter aperture. A mount may mate the igniter with the shell.

An aperture may be defined by and extend laterally through the body from the outer surface to the inner surface.

A funnel-shaped portion of the shell may extend around the body and define the cooling aperture. The funnel-shaped portion of the shell may have a substantially straight sectional geometry. Alternatively, the funnel-shaped portion of the shell may have an arcuate sectional geometry. Still alternatively, the funnel-shaped portion of the shell may have a compound sectional geometry.

The funnel-shaped portion of the shell may extend laterally and vertically from a base portion of the shell towards the body. The base portion of the shell may be substantially parallel with an opposing portion of the heat shield.

A first angle of incidence may be defined relative to an axis of the first cooling aperture and a surface of the shell. The shell may define a second cooling aperture through which air is directed to impinge against the outer surface. A second angle of incidence may be defined relative to an axis of the second cooling aperture and the surface of the shell. The second angle of incidence may be different than (or the same as) the first angle of incidence.

The body may include a rib that partially defines the outer surface. At least a portion of the rib may be configured as or otherwise include a chevron.

The body may include a point protrusion that partially defines the outer surface.

A channel may extend into the body and be defined by the outer surface.

A sleeve may extend around the body and extend vertically from the heat shield towards the shell.

The heat shield may include a plurality of panels that are attached to the shell. The body may be connected to one of the panels.

The foregoing features and the operation of the invention will become more apparent in light of the following description and the accompanying drawings.

DETAILED DESCRIPTION OF THE INVENTION

Figure 1:
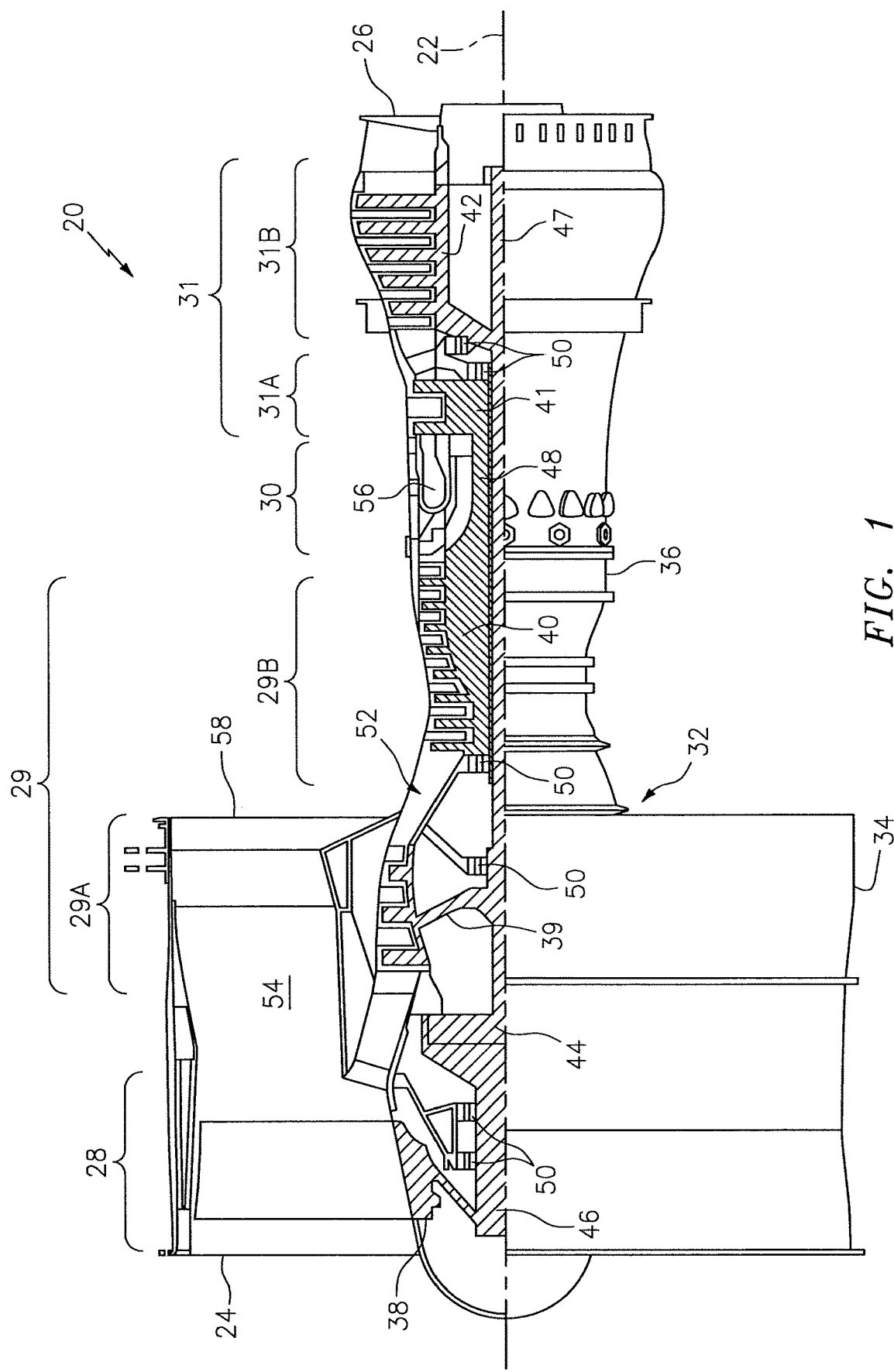
FIG. 1 is a side cutaway illustration of a geared turbine engine.

FIG. 1 is a side cutaway illustration of a geared turbine engine 20. The turbine engine 20 extends along an axial centerline 22 between a forward and upstream airflow inlet 24 and an aft and downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 32, which includes a first engine case 34 and a second engine case 36.

Each of the engine sections 28, 29A, 29B, 31A and 31B includes a respective rotor 38-42. Each of the rotors 38-42 includes a plurality of rotor blades arranged circumferentially around and connected to one or more respective rotor disks. The rotor blades, for example, may be formed integral with or mechanically fastened, welded, brazed, adhered or otherwise attached to the respective rotor disk(s).

The fan rotor 38 is connected to a gear train 44 through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50. Each of the bearings 50 is connected to the second engine case 36 by at least one stationary structure such as, for example, an annular support strut.

Air enters the turbine engine 20 through the airflow inlet 24, and is directed through the fan section 28 and into an annular core gas path 52 and an annular bypass gas path 54. The air within the core gas path 52 may be referred to as "core air". The air within the bypass gas path 54 may be referred to as "bypass air".

The core air is directed through the engine sections 29-31 and exits the turbine engine 20 through the airflow exhaust 26. Within the combustor section 30, fuel is injected into a combustion chamber 56 and mixed with the core air. This fuel-core air mixture is ignited to power the turbine engine 20 and provide forward engine thrust. The bypass air is directed through the bypass gas path 54 and out of the turbine engine 20 through a bypass nozzle 58 to provide additional forward engine thrust. Alternatively, the bypass air may be directed out of the turbine engine 20 through a thrust reverser to provide reverse engine thrust.

Figure 2:
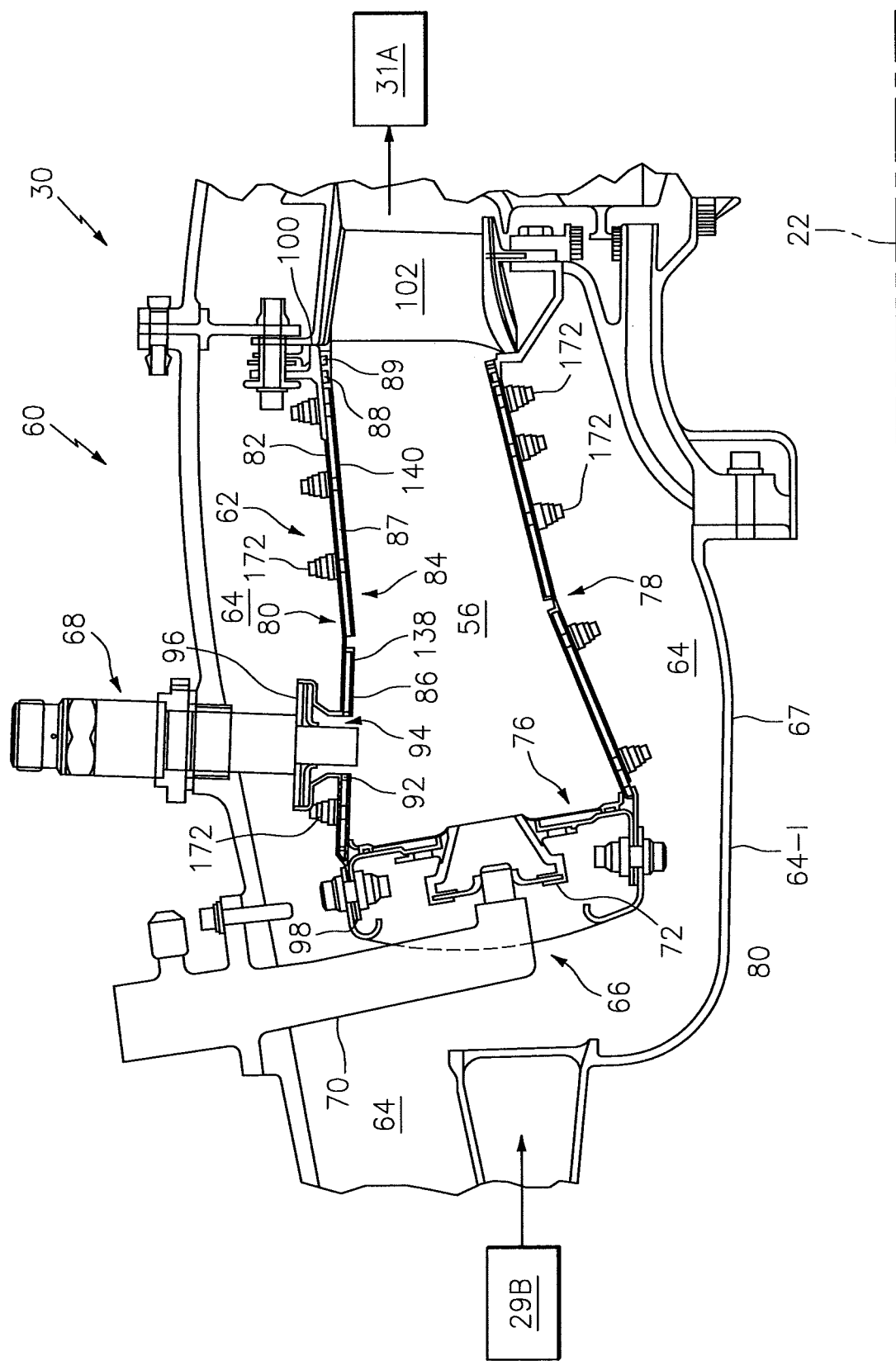
FIG. 2 is a side cutaway illustration of a portion of a combustor section.

FIG. 2 illustrates an assembly 60 of the turbine engine 20. The turbine engine assembly 60 includes a combustor 62 disposed within a plenum 64 of the combustor section 30. This plenum 64 receives compressed core air from the HPC section 29B, and provides the received core air to the combustor 62 as described below in further detail.

Figure 3:
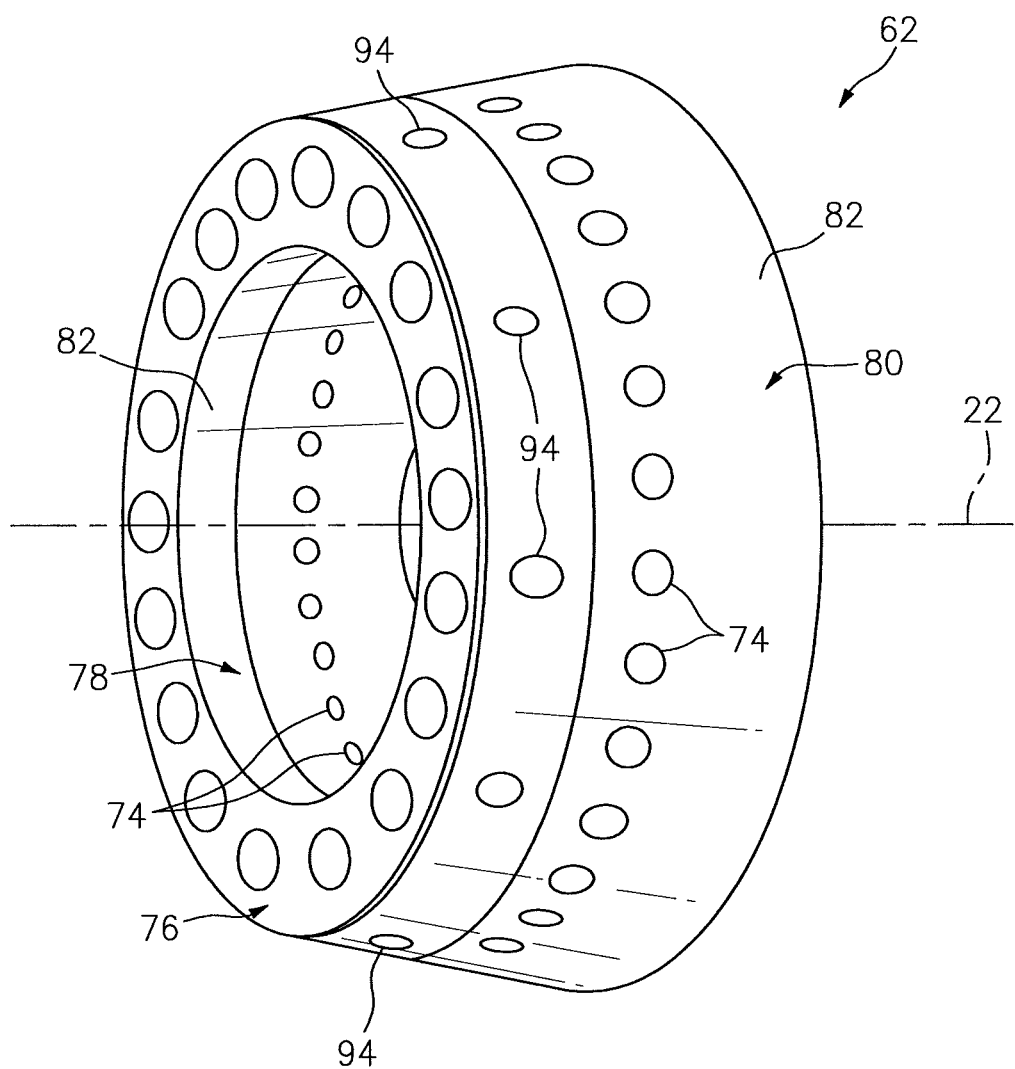
FIG. 3 is a perspective illustration of a portion of a combustor.

The turbine engine assembly 60 also includes one or more fuel injector assemblies 66 and one or more igniters 68. Each fuel injector assembly 66 may include a fuel injector 70 mated with a swirler 72. The fuel injector 70 injects the fuel into the combustion chamber 56. The swirler 72 directs some of the core air from the plenum 64 into the combustion chamber 56 in a manner that facilitates mixing the core air with the injected fuel. The igniters 68 ignite the fuel-core air mixture. Quench apertures 74 (see FIG. 3) in walls of the combustor 62 direct additional core air into the combustion chamber 56 to quench (e.g., stoichiometrically lean) the ignited fuel-core air mixture.

The combustor 62 may be configured as an annular floating wall combustor. The combustor 62 of FIGS. 2 and 3, for example, includes an annular combustor bulkhead 76, a tubular combustor inner wall 78, and a tubular combustor outer wall 80. The bulkhead 76 extends radially between and is connected to the inner wall 78 and the outer wall 80. The inner wall 78 and the outer wall 80 each extends axially along the centerline 22 from the bulkhead 76 towards the HPT section 31A, thereby defining the combustion chamber 56.

Figure 4:
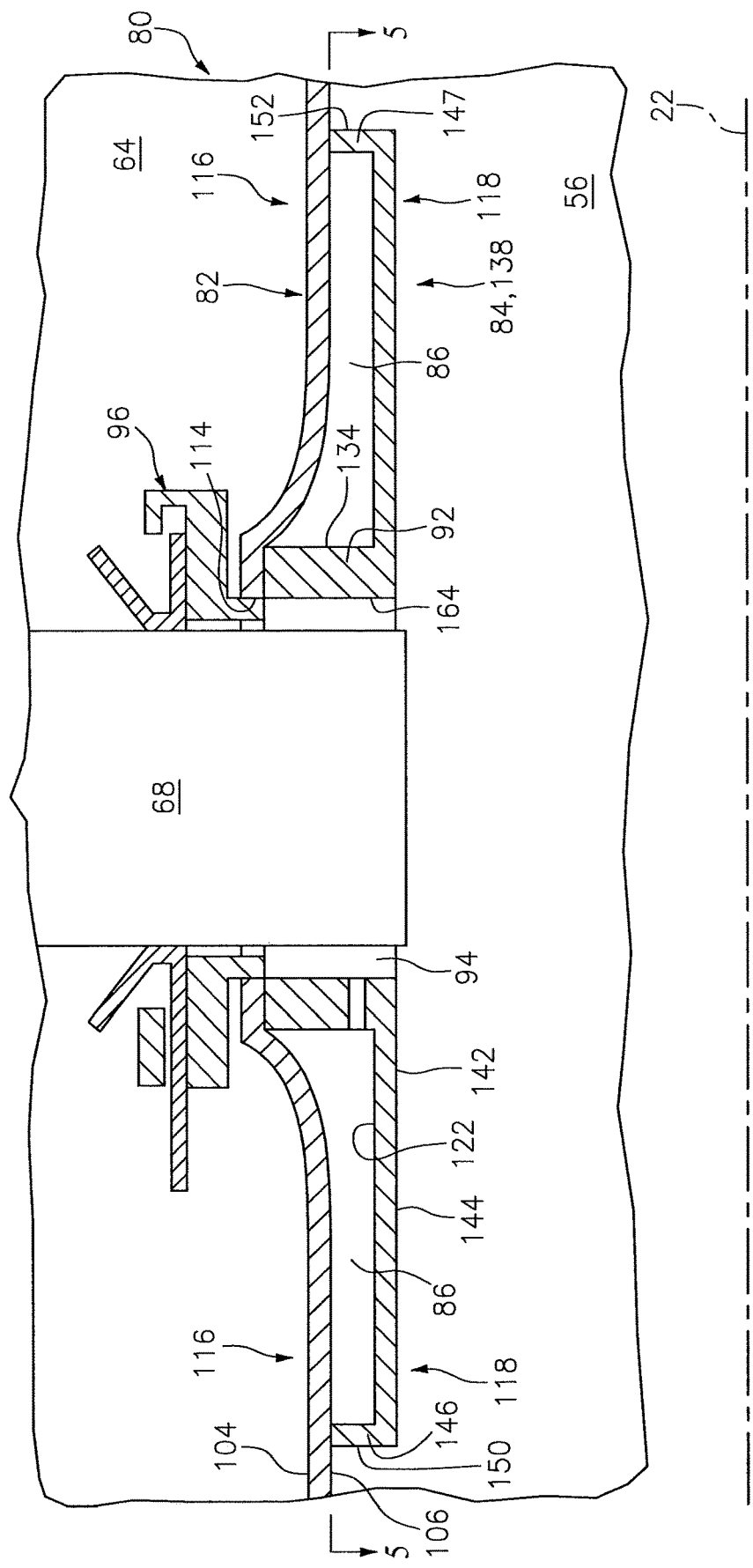
FIG. 4 is a side sectional illustration of a portion of a combustor wall.
Figure 5:
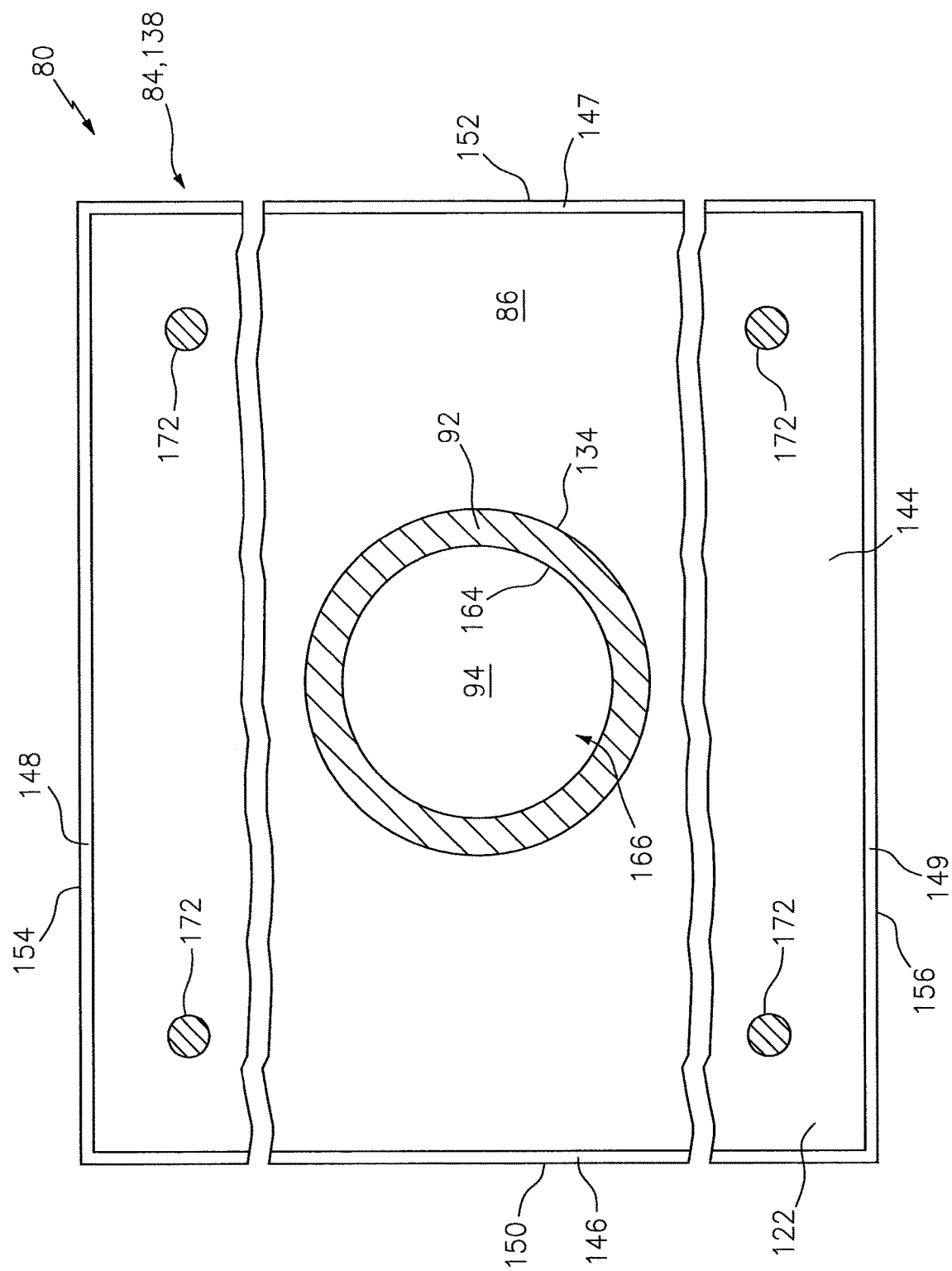
FIG. 5 is a sectional illustration of a portion of the combustor wall of FIG. 4.
Figure 6:
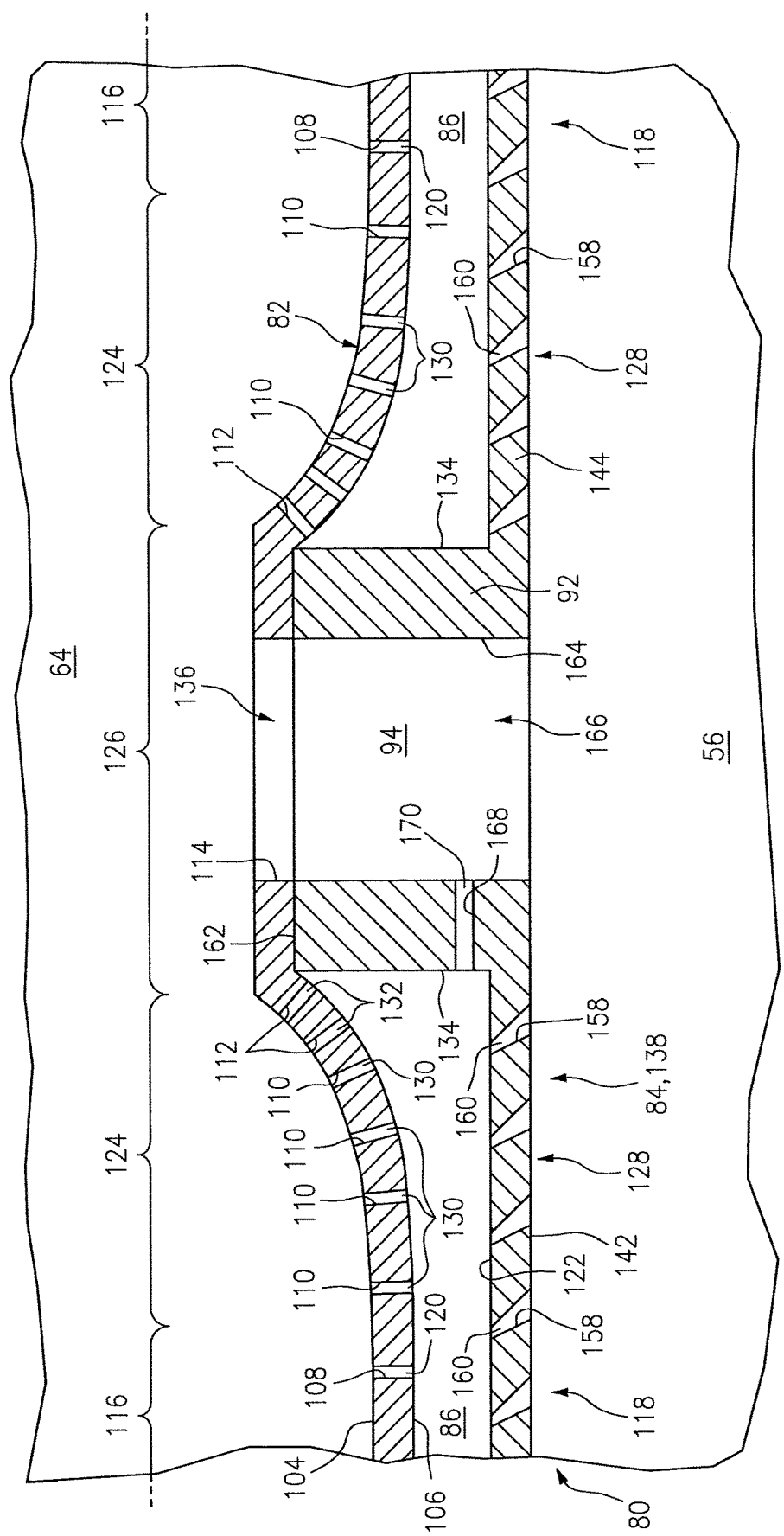
FIG. 6 is a detailed side sectional illustration of a portion of the combustor wall of FIG. 4.
Figure 7:
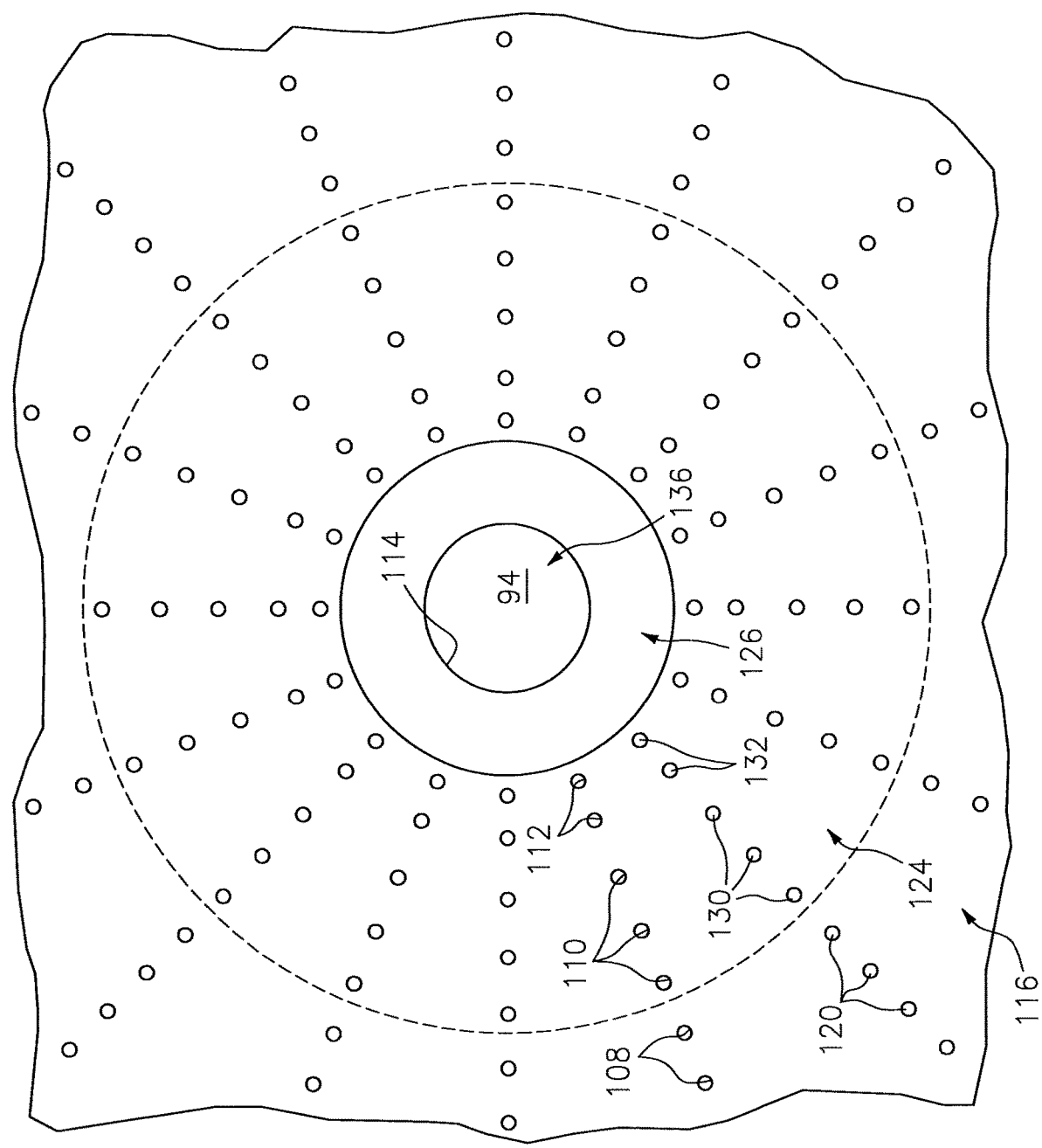
FIG. 7 is a detailed side illustration of the portion of the combustor wall of FIG. 4.

FIG. 4 is a side sectional illustration of an exemplary upstream portion of the outer wall 80. FIG. 5 is a sectional illustration of a portion of the outer wall 80 of FIG. 4. FIG. 6 is a detailed side sectional illustration of a portion of the outer wall 80 of FIG. 4. FIG. 7 is a detailed side illustration of the portion of the outer wall 80 of FIG. 4. It should be noted that some details of the outer wall 80 shown in FIGS. 6 and 7 are not shown in FIGS. 2, 4 and 5 for ease of illustration. In addition, it should also be noted the inner wall 78 may also have a similar configuration to that of the outer wall 80 illustrated in the drawings and described below.

Referring to FIGS. 2 and 4-7, the outer wall 80 may be configured as a multi-walled structure; e.g., a hollow dual-walled structure. The outer wall 80 of FIGS. 2 and 4-7, for example, includes a tubular combustor shell 82, a tubular combustor heat shield 84, and one or more cooling cavities 86-89 (e.g., impingement cavities) between the shell 82 and the heat shield 84.

The outer wall 80 may also include one or more annular igniter aperture bodies 92 (e.g., grommets). These igniter aperture bodies 92 are disposed circumferentially around the centerline 22. Each igniter aperture body 92 partially or completely defines a respective igniter aperture 94 (see also FIG. 3) in the outer wall 80, which aperture 94 receives a respective one of the igniters 68. Each igniter 68, for example, extends vertically into or through the respective igniter aperture 94. Each igniter 68 is mated to the shell 82 and, thus, the outer wall 80 by an igniter mount 96.

Referring to FIG. 2, the shell 82 extends circumferentially around the centerline 22. The shell 82 extends axially along the centerline 22 between an axial forward end 98 and an axial aft end 100. The shell 82 is connected to the bulkhead 76 at the forward end 98. The shell 82 may be connected to a stator vane assembly 102 or the HPT section 31A at the aft end 100.

Referring to FIGS. 4, 6 and 7, the shell 82 has an exterior surface 104, an interior surface 106, one or more aperture surfaces 108, one or more aperture surfaces 110, one or more aperture surfaces 112, and one or more aperture surfaces 114. One or more portions of the shell 82 extend (e.g., radially) between the shell exterior surface 104 and the shell interior surface 106. The shell exterior surface 104, which may also be referred to as a plenum surface, defines a portion of a boundary of the plenum 64. The shell interior surface 106, which may also be referred to as a cavity surface, defines a portion of a boundary of one or more of the cavities 86-89 (see FIG. 2).

The aperture surfaces 108 may be arranged in one or more arrays disposed along the centerline 22. The apertures surfaces 108 in each array, for example, may be arranged circumferentially around the centerline 22. The aperture surfaces 108 are defined by and located in a base portion 116 of the shell 82. This shell base portion 116 has a generally tubular geometry and is configured substantially parallel with an opposing base portion 118 of the heat shield 84 (see FIGS. 2 and 4), which also has a generally tubular geometry.

Figure 8:
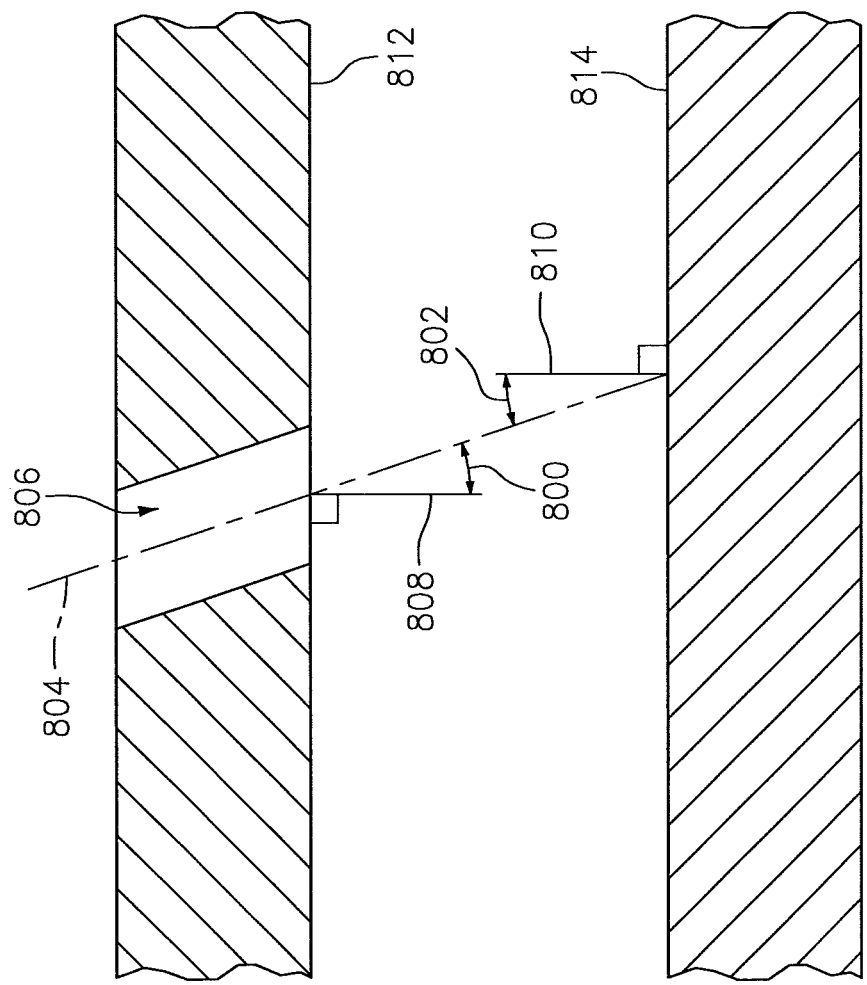
FIGS. 8-11 are side-sectional illustrations of respective portions of alternate embodiment combustor walls.

Each of the aperture surfaces 108 defines a cooling aperture 120. Each cooling aperture 120 extends vertically through the shell 82 from the shell exterior surface 104 to the shell interior surface 106. Each cooling aperture 120 may be configured as an impingement aperture. Each aperture surface 108 of FIG. 6, for example, is configured to direct a jet of cooling air to impinge substantially against the heat shield 84. One or more of the cooling apertures 120 and, thus, the aperture surfaces 108 may each be configured with a substantially zero angle of incidence relative to one or more of the surfaces 104 and 106 as well as a respective interior surface 122 of the heat shield 84. Referring to FIG. 8, the term "angle of incidence" may describe an angle 800, 802 between a centerline 804 of a cooling aperture 806 and a respective axis 808, 810 extending perpendicularly out from a surface 812 adjacent or a surface 814 opposite the cooling aperture 806. Of course, in other embodiments, one or more of the cooling apertures 120 of FIG. 6 may each have a non-zero angle of incidence relative to one or more of the surfaces 104, 106 and 122.

Referring to FIGS. 4, 6 and 7, the aperture surfaces 110 may be arranged in one or more groupings. Each grouping of the aperture surfaces 110 is generally circumferentially and axially aligned with a respective one of the igniter aperture bodies 92 and around a respective one of the aperture surfaces 114. The aperture surfaces 110 in each grouping may be defined by and located in a respective funnel-shaped portion 124 of the shell 82.

The funnel-shaped portion 124 extends around a respective one of the igniter aperture bodies 92 and its igniter aperture 94. The funnel-shaped portion 124 is connected to the shell base portion 116 and a respective annular mounting portion 126 of the shell 82. The funnel-shaped portion 124 extends laterally (e.g., circumferentially and/or axially) and vertically, in a direction away from the respective heat shield 84, between the shell base portion 116 and respective shell mounting portion 126. The funnel-shaped portion 124 may be configured non-parallel with (e.g., acutely angled to) an opposing portion 128 of the heat shield 84 (see FIGS. 2 and 4), which may have a similar geometry as the heat shield base portion 118.

Each of the aperture surfaces 110 defines a cooling aperture 130. Each cooling aperture 130 extends vertically and/or laterally through the shell 82 from the shell exterior surface 104 to the shell interior surface 106. Each cooling aperture 130 may be configured as an impingement aperture. Each aperture surface 110 of FIG. 6, for example, is configured to direct a jet of cooling air to impinge substantially against the heat shield 84. One or more of the cooling apertures 130 and, thus, the aperture surfaces 110 may each be configured with a substantially zero angle of incidence relative to one or more of the surfaces 104 and 106. Due to the geometry of the funnel-shaped portion 124, however, one or more of the cooling apertures 130 and, thus, the aperture surfaces 110 may also be configured with a non-zero angle of incidence relative to the respective interior surface 122 of the heat shield 84. Of course, in other embodiments, the one or more of the cooling apertures 130 may each have a non-zero angle of incidence relative to one or more of the surfaces 104 and 106.

Referring to FIGS. 4, 6 and 7, the aperture surfaces 112 may be arranged in one or more groupings. Each grouping of the aperture surfaces 112 is generally circumferentially and axially aligned with a respective one of the igniter aperture bodies 92 and/or a respective one of the aperture surface 110 groupings. The aperture surfaces 112 in each grouping may be defined by and located in the funnel-shaped portion 124 of the shell 82. More particularly, the aperture surfaces 112 are located laterally between the respective aperture surface 110 grouping and the respective shell mounting portion 126.

Each of the aperture surfaces 112 defines a cooling aperture 132. Each cooling aperture 132 extends vertically and/or laterally through the shell 82 from the shell exterior surface 104 to the shell interior surface 106. Each cooling aperture 132 may be configured as an impingement aperture. In accordance with various embodiments of the present disclosure, a number of aperture surfaces 112 of FIG. 6, for example, are configured to direct a jet of cooling air to impinge substantially against an outer surface 134 of the respective igniter aperture body 92. One or more of the cooling apertures 132 and, thus, the aperture surfaces 112 may each be configured with a substantially zero angle of incidence relative to one or more of the surfaces 104 and 106. It will be appreciated that due to the geometry of the funnel-shaped portion 124, however, one or more of the cooling apertures 132 and, thus, the aperture surfaces 112 may also be configured with a non-zero angle of incidence relative to the body outer surface 134 and, thus, impinge upon the body outer surface 134 to a degree corresponding to the angle and proximity to the wall 131. Of course, in other embodiments, the one or more of the cooling apertures 132 in the funnel-shaped portion 124 may each have a non-zero angle of incidence relative to one or more of the surfaces 104 and 106 and/or a substantially zero angle of incidence relative to the body outer surface 134.

Referring to FIGS. 6 and 7, the aperture surfaces 114 may be arranged in a circumferential array. Each aperture surface 114 is defined by and located in a respective one of the shell mounting portions 126. Each aperture surface 114 defines a portion of a respective one of the igniter apertures 94. Each aperture surface 114, for example, defines a through-hole 136 that extends through the shell 82 from the shell exterior surface 104 to the shell interior surface 106. In alternative embodiments, however, each aperture surface 114 may be adapted to abut against and form a seal with a respective one of the igniter aperture bodies 92.

Referring to FIG. 2, the heat shield 84 extends circumferentially around the centerline 22. The heat shield 84 extends axially along the centerline 22 between an axial forward end and an axial aft end. The forward end is located at an interface between the combustor wall and the bulkhead 76. The aft end may be located at an interface between the combustor wall and the stator vane assembly 102 or the HPT section 31A.

The heat shield 84 may include one or more heat shield panels 138 and 140, one or more of which may have an arcuate geometry. The panels 138 and 140 are respectively arranged at discrete locations along the centerline 22. The panels 138 are disposed circumferentially around the centerline 22 and form a forward hoop. The panels 140 are disposed circumferentially around the centerline 22 and form an aft hoop. Alternatively, the heat shield 84 may be configured from one or more tubular bodies.

Referring to FIGS. 4 and 5, each of the panels 138 has at least one interior surface 122 and an exterior surface 142. At least a portion of the panel 138 extends (e.g., radially) between the interior surface 122 and the exterior surface 142. Each interior surface 122, which may also be referred to as a cavity surface, defines a respective one of the cooling cavities 86. The exterior surface 142, which may also be referred to as a chamber surface, defines a portion of the combustion chamber 56.

Each panel 138 includes a panel base 144 and one or more rails 146-149. The panel base 144 and the panel rails 146-149 may collectively define the interior surface 122. The panel base 144 may define the exterior surface 142.

The panel base 144 may be configured as a generally curved (e.g., arcuate) plate. The panel base 144 extends axially between an axial forward end 150 and an axial aft end 152. The panel base 144 extends circumferentially between opposing circumferential ends 154 and 156.

The panel rails may include one or more axial end rails 146 and 147 and one more circumferential end rails 148 and 149. Each of the panel rails 146-149 of the outer wall 80 extends radially out from the respective panel base 144.

The axial end rails 146 and 147 extend circumferentially between and are connected to the circumferential end rails 148 and 149. The axial end rail 146 is arranged at (e.g., on, adjacent or proximate) the forward end 150. The axial end rail 147 is arranged at the aft end 152. The circumferential end rail 148 is arranged at the circumferential end 154. The circumferential rail 149 is arranged at the circumferential end 156.

Referring to FIG. 6, each panel 138 may also have one or more aperture surfaces 158. These aperture surfaces 158 may be respectively arranged in one or more arrays disposed along the centerline 22. The aperture surfaces 158 in each array may be disposed circumferentially around the centerline 22.

Each of the aperture surfaces 158 defines a cooling aperture 160 in the panel 138 and, thus, the heat shield 84. Each cooling aperture 160 may extend vertically and/or laterally through the panel base 144. Each cooling aperture 160 may be configured as an effusion aperture. Each aperture surface 158 of FIG. 6, for example, is configured to direct a jet of cooling air into the combustion chamber 56 to film cool a downstream portion of the heat shield 84. One or more of the cooling apertures 160 and, thus, the aperture surfaces 158 may each be configured with non-zero (e.g., between about 60° and about 85°) angle of incidence relative to one or more of the surfaces 122 and 142. Of course, in other embodiments, the one or more of the cooling apertures 160 may each have a substantially zero angle of incidence relative to one or more of the surfaces 122 and 142.

Referring to FIGS. 4-6, each of the igniter aperture bodies 92 is formed integral with or attached to a respective one of the panel bases 144. One or more of the igniter aperture bodies 92 are arranged within a respective one of the cooling cavities 86. One or more of the igniter aperture bodies 92, for example, may be arranged circumferentially between the circumferential end rails 148 and 149 of a respective one of the panels 138. One or more of the igniter aperture bodies 92 may be arranged axially between the axial end rails 146 and 147 of a respective one of the panels 138.

Each igniter aperture body 92 extends vertically from the panel base 144 to a distal end surface 162, which engages (e.g., contacts) and forms a seal with the interior surface 106 of a respective one of the shell mounting portions 126. Each igniter aperture body 92 extends laterally between an inner surface 164 and the respective body outer surface 134. The body inner surface 164 is circumferentially and axially aligned with a respective one of the aperture surfaces 114. The body inner surface 164 defines at least a portion of a respective one of the igniter apertures 94. The body inner surface 164, for example, defines a through-hole 166 that extends through the panel 138 from the distal end surface 162 to the exterior surface 142. The body inner surface 164 may have a circular cross-sectional geometry. The body outer surface 134 may also have a circular cross-sectional geometry. Of course, in other embodiments, one or more of the surfaces 134 and 164 may each have a non-circular cross-sectional geometry; e.g., an oval cross-sectional geometry, an elliptical cross-sectional geometry, a pear-shaped cross-sectional geometry, a polygonal (e.g., rectangular) cross-sectional geometry, or any other symmetric or asymmetric shaped cross-sectional geometry with, for example, its major axis aligned (e.g., parallel) with the centerline 22.

Referring to FIG. 6, each igniter aperture body 92 may also have at least one aperture surface 168. This aperture surface 168 defines a cooling aperture 170 in the igniter aperture body 92. The cooling aperture 170 extends laterally through the igniter aperture body 92. The cooling aperture 170 is configured to direct air into the igniter aperture 94 to reduce or prevent accumulation of relatively hot air adjacent the respective igniter 68 (see FIG. 4). Of course, in other embodiments, one or more of the igniter aperture bodies 92 may be configured without the aperture surface 168.

Referring to FIG. 2, the heat shield 84 is arranged radially within the shell 82, and defines an outer side of the combustion chamber 56. The heat shield 84 and, more particularly, each of the panels 138 and 140 may be respectively attached to the shell 82 by a plurality of mechanical attachments 172; e.g., threaded studs respectively mated with washers and nuts. The shell 82 and the heat shield 84 thereby respectively form the cooling cavities 86-89 in the combustor wall 80.

Referring to FIGS. 4-6, each cooling cavity 86 is defined and extends vertically between the interior surface 106 and a respective one of the interior surfaces 122 as set forth above. Each cooling cavity 86 is defined and extends circumferentially between the circumferential end rails 148 and 149 of a respective one of the panels 138. Each cooling cavity 86 is defined and extends axially between the axial end rails 146 and 147 of a respective one of the panels 138. In this manner, each cooling cavity 86 may fluidly couple one or more of the cooling apertures 120, 130 and 132 in the shell 82 with one or more of the cooling apertures 160 in the heat shield 84.

During turbine engine operation, core air from the plenum 64 is directed into each cooling cavity 86 through respective cooling apertures 120, 130 and 132. The core air (e.g., cooling air) flowing through the cooling apertures 120 and 130 may impinge against the respective panel base 144, thereby impingement cooling the panel 138 and the heat shield 84. The cooling air flowing through the cooling apertures 132 may impinge against the respective body outer surfaces 134, thereby impingement cooling and/or film cooling the igniter aperture bodies 92. In this manner, thermally induced stress within the igniter aperture bodies 92 and/or adjacent portions of the panel base 144 may be reduced.

The cooling air within each cooling cavity 86 is directed through respective cooling apertures 160 and into the combustion chamber 56, thereby film cooling a downstream portion of the heat shield 84. Within each cooling aperture 160, the cooling air may also cool the heat shield 84 through convective heat transfer.

Figure 9:
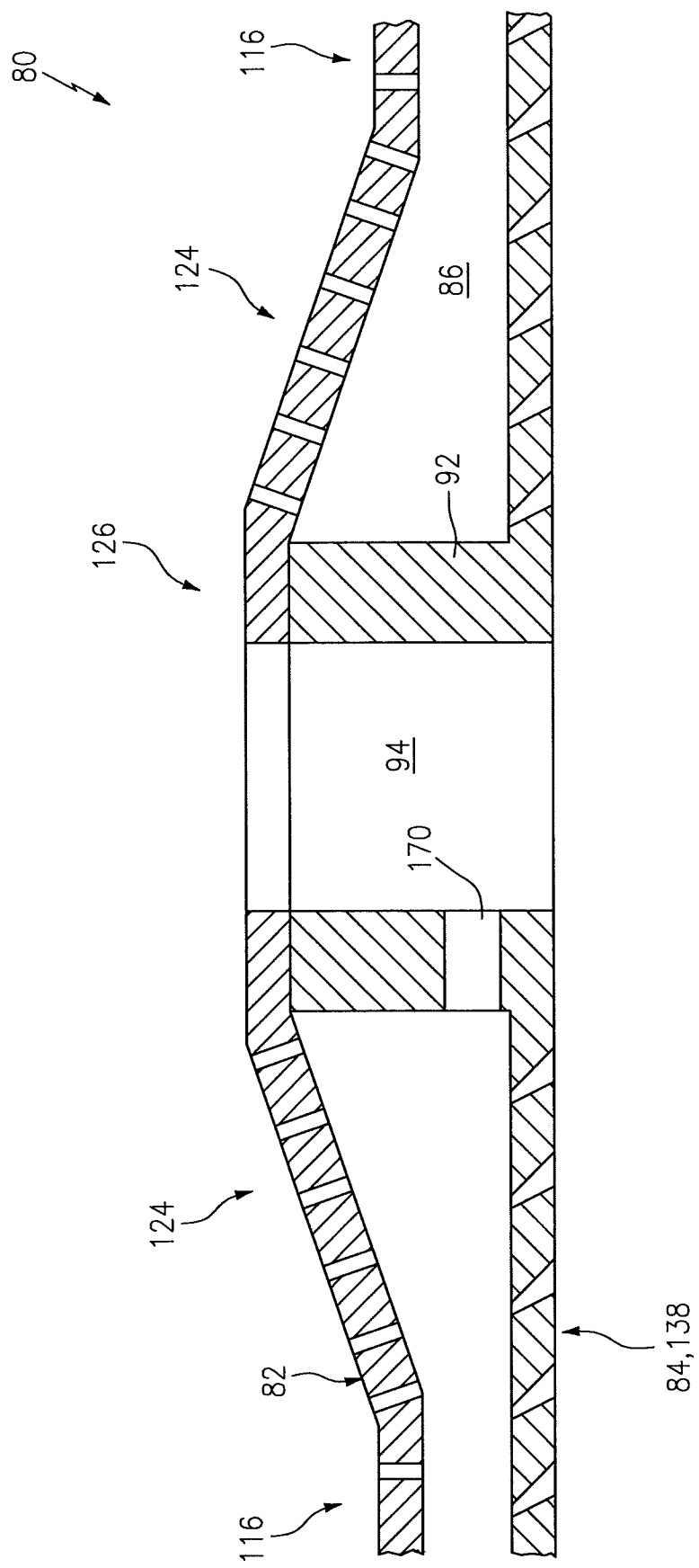
Figure 10:
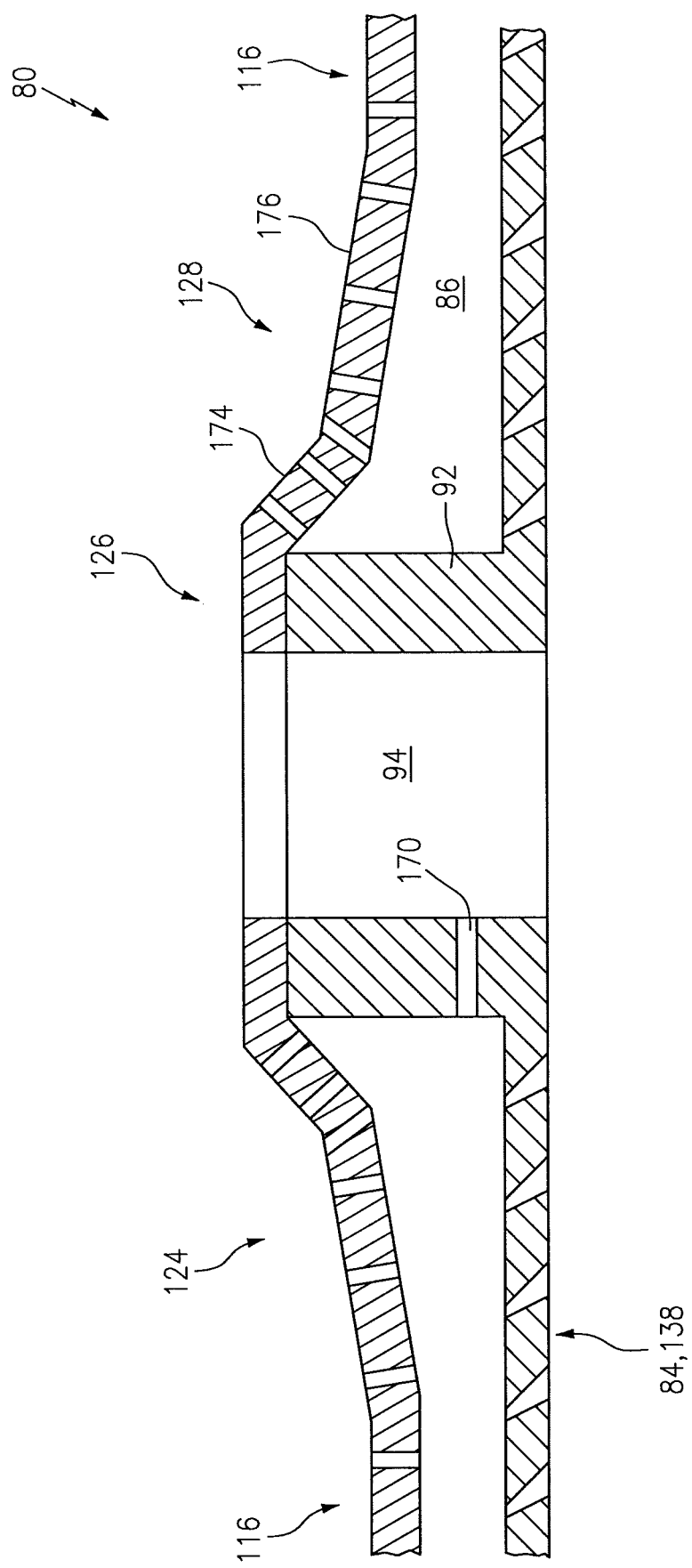

In some embodiments, referring to FIG. 6, one or more of the funnel-shaped portions 124 may each have an arcuate side-sectional geometry. In some embodiments, referring to FIG. 9, one or more of the funnel-shaped portions 124 may each have a substantially straight side-sectional geometry. In some embodiments, referring to FIG. 10, one or more of the funnel-shaped portions 124 may each have a compound side-sectional geometry. The funnel-shaped portion 124 of FIG. 10, for example, may include a plurality of sub-portions 174 and 176. Each sub-portion 174, 176 has a substantially straight side-sectional geometry. The first sub-portion 174, however, is obtusely (or acutely) angled relative to the second sub-portion 176. Of course, in other embodiments, one or more of the funnel-shaped portions 124 may each have a geometry that is different from those described above and illustrated in the drawings.

Figure 11:
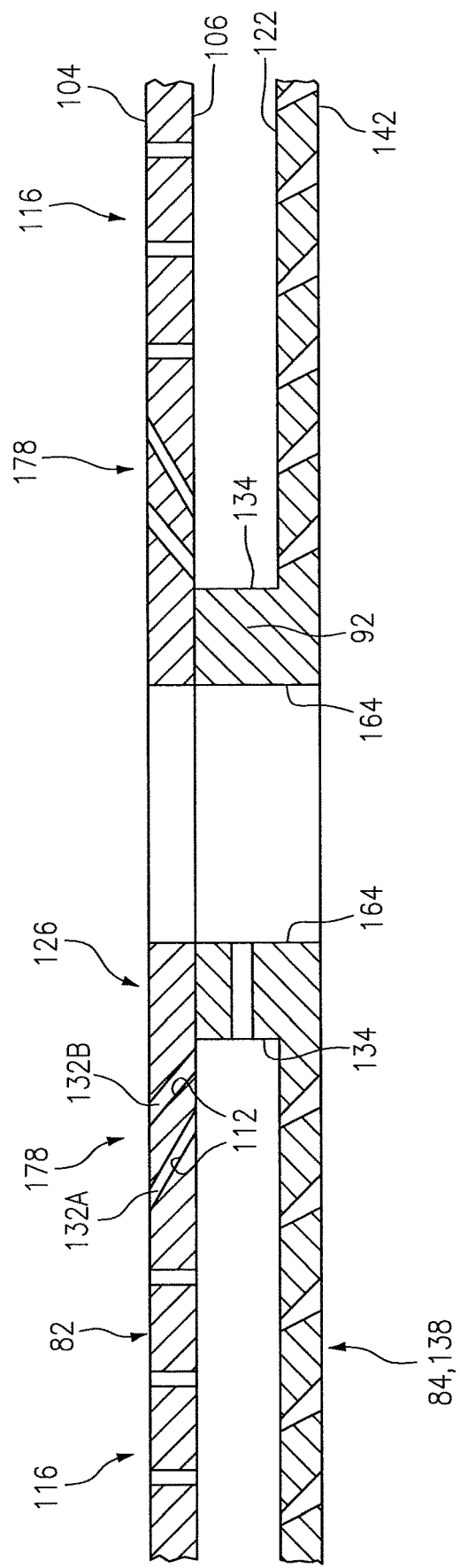

In some embodiments, referring to FIG. 11, one or more of the funnel-shaped portions 124 (see FIG. 6) may each be replaced with a substantially flat intermediate portion 178. This intermediate portion 178 may define one or more of the aperture surfaces 112 and, thus, one or more of the cooling apertures 132; e.g., cooling apertures 132A and 132B. To provide cooling to the respective igniter aperture body 92, in various embodiments of the present disclosure, each of the cooling apertures (e.g., 132A and 132B) extends along a centerline with a trajectory to the body outer surface 134. For example, each of the cooling apertures 132A and 132B may have a non-zero angle of incidence relative to the surfaces 104 and 106. The angle of incidence of the outer peripheral cooling apertures 132A, however, may be different (e.g., greater) than the angle of incidence of the inner peripheral cooling apertures 132B. For example, each outer peripheral cooling aperture 132A may have an angle of incidence between about seventy degrees (70°) and about eighty degrees (80°). Each inner peripheral cooling aperture 132B may have an angle of incidence between about fifty-five degrees (55°) and about sixty-five degrees (65°). The present invention, however, is not limited to the foregoing example.

Figure 12:
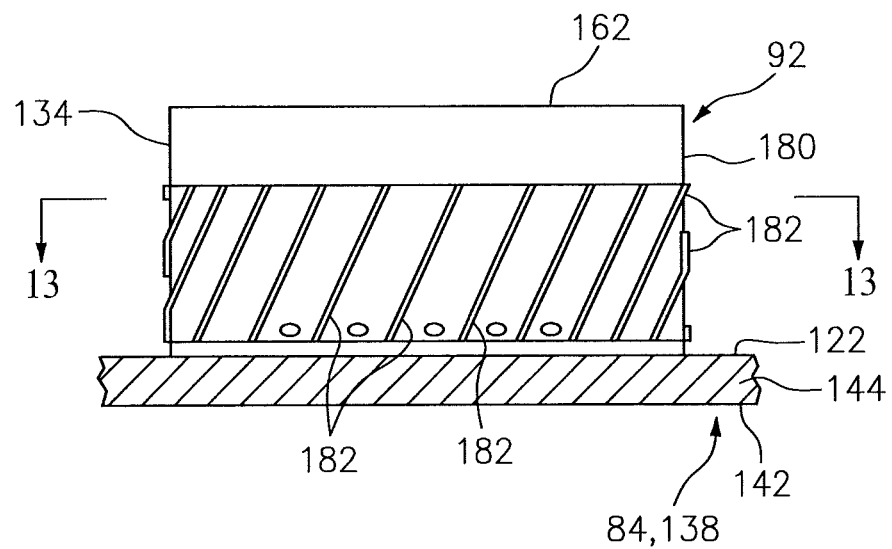
FIG. 12 is a side-sectional illustration of a portion of a heat shield configured with an igniter aperture body.
Figure 13:
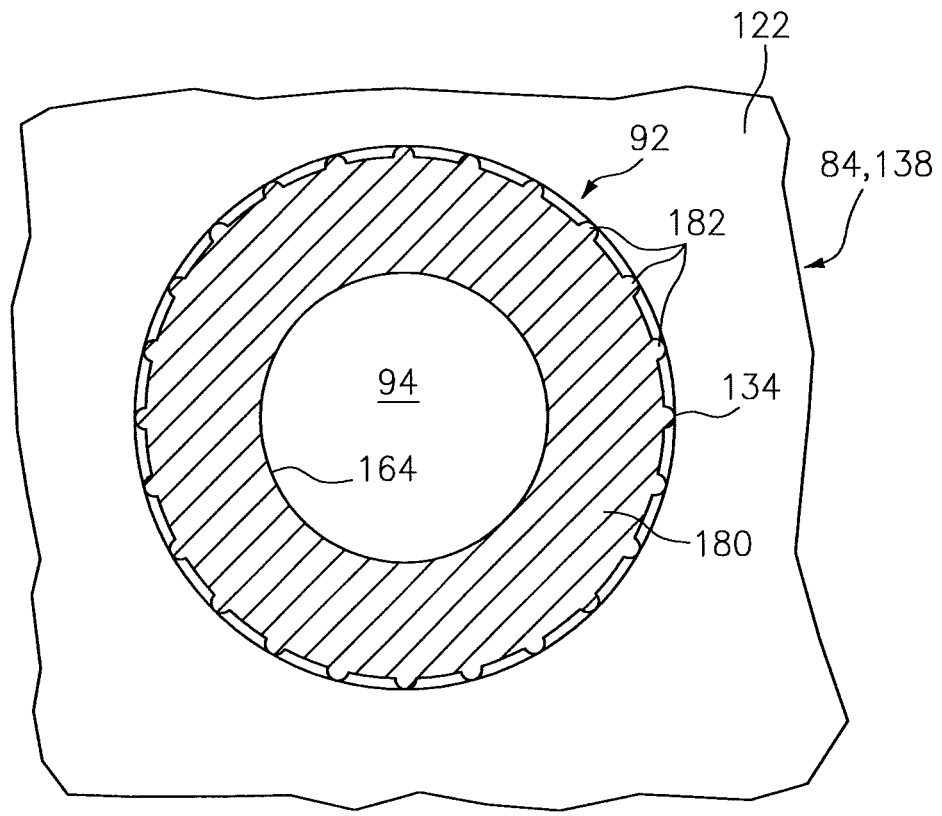
FIG. 13 is a cross-sectional illustration of the igniter aperture body of FIG. 12.
Figure 14:
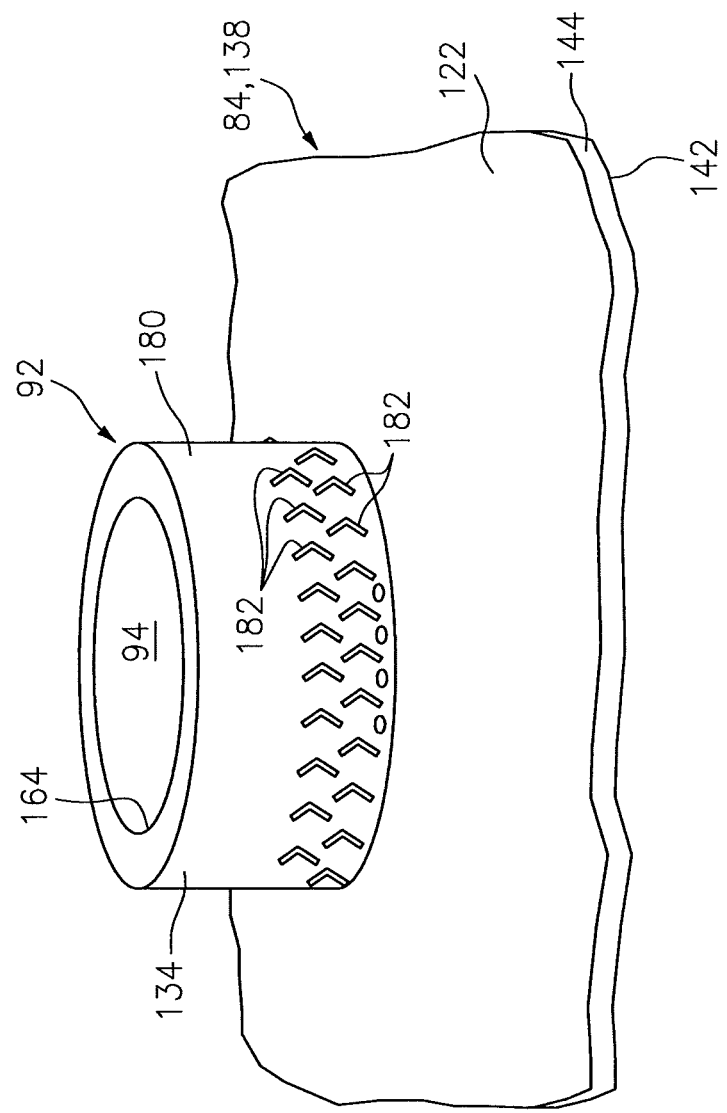
FIGS. 14-16 are perspective illustrations of respective portions of a heat shield configured with alternate embodiment igniter aperture bodies.

In some embodiments, referring to FIGS. 12 and 13, one or more of the igniter aperture bodies 92 may each include a base 180 configured with one or more ribs 182. These ribs 182 may be arranged around and connected to the base 180. The ribs 182 and the base 180 may collectively define the body outer surface 134. One or more of the ribs 182 may each be configured to spiral around the base 180 in a manner that directs cooling air towards the interior surface 122. The ribs 182 may also increase convective cooling of the respective igniter aperture body 92 by increasing available heat transfer area of the outer surface 134 as well as turbulating the cooling air. The present invention, however, is not limited to the foregoing rib configuration. For example, in the embodiment of FIG. 14, one or more of the ribs 182 are each configured as a chevron. In addition, the ribs 182 are arranged into a plurality of circumferential arrays disposed vertically along the base 180.

Figure 15:
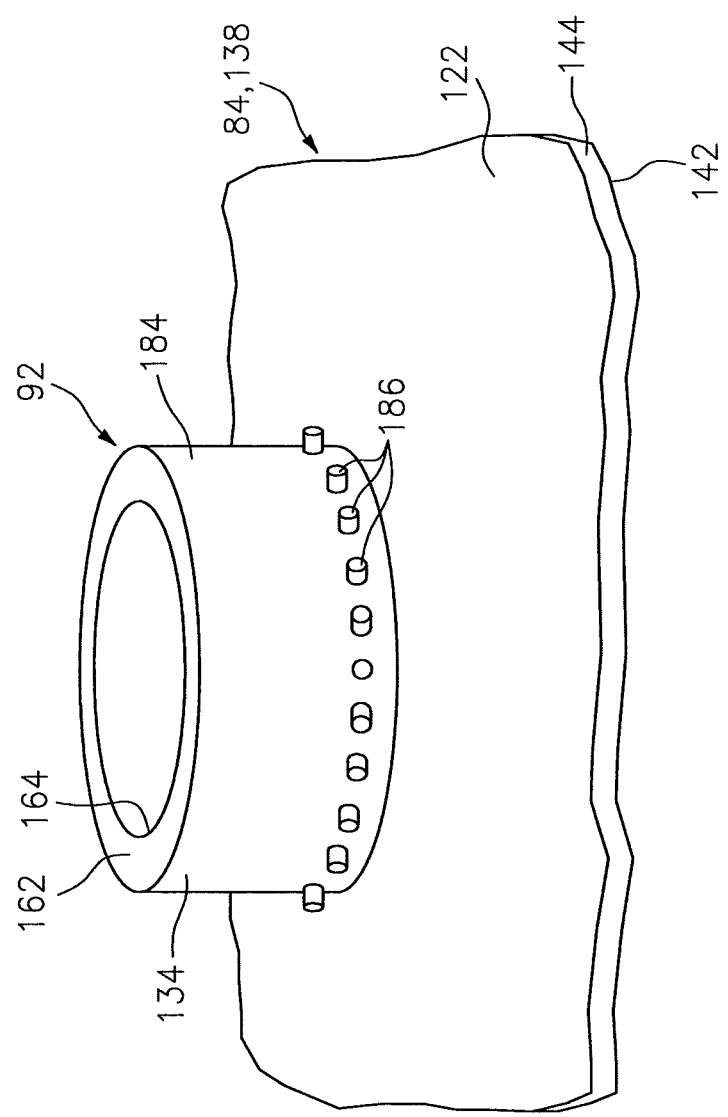

In some embodiments, referring to FIG. 15, one or more of the igniter aperture bodies 92 may each include a base 184 configured with one or more point protrusions 186; e.g., pins, nodules, or any other type of cooling element. These point protrusions 186 may be arranged around and connected to the base 184. The point protrusions 186 and the base 184 may collectively define the body outer surface 134. The point protrusions 186 may also increase convective cooling of the respective igniter aperture body 92 by increasing available heat transfer area of the outer surface 134 as well as turbulating the cooling air.

Figure 16:
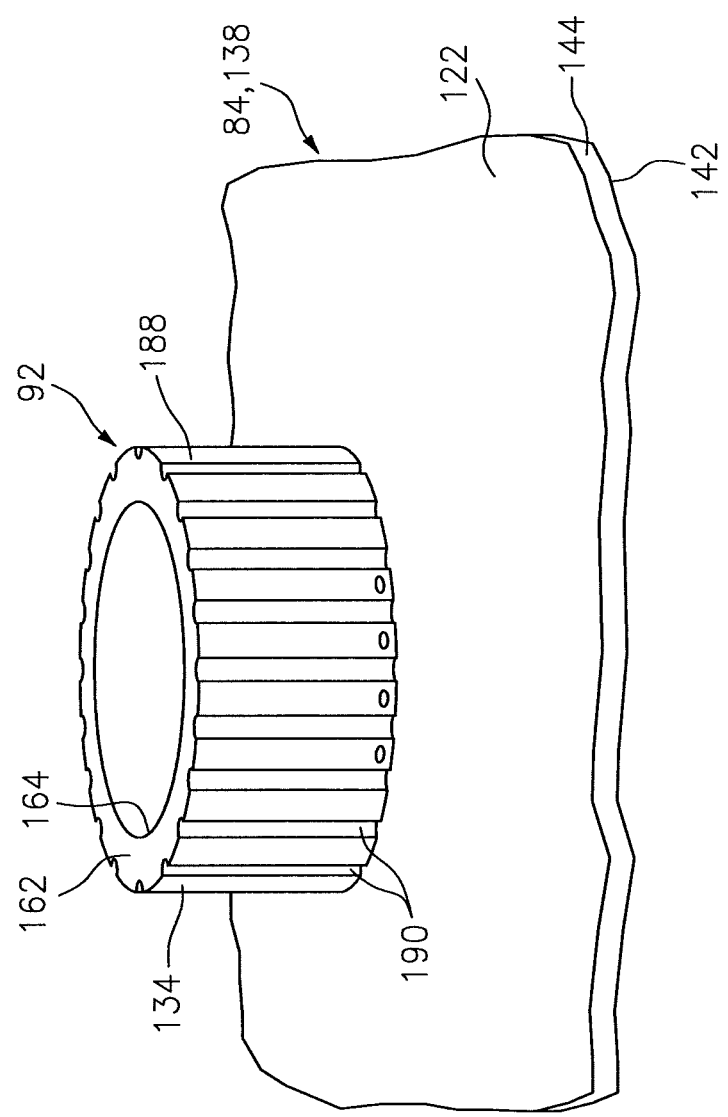

In some embodiments, referring to FIG. 16, one or more of the igniter aperture bodies 92 may each include a base 188 configured with one or more channels 190, or any other type of indentation or recess that increase available heat transfer area of the outer surface 134. These channels 190 are defined by the body outer surface 134. Each channel 190 extends laterally into the base 188 from an outer periphery of the base 188. Each channel 190 may extend vertically into the base 188 from the distal end surface 162 to (or towards) the interior surface 122. The present invention, however, is not limited to the foregoing channel configuration.

Figure 17:
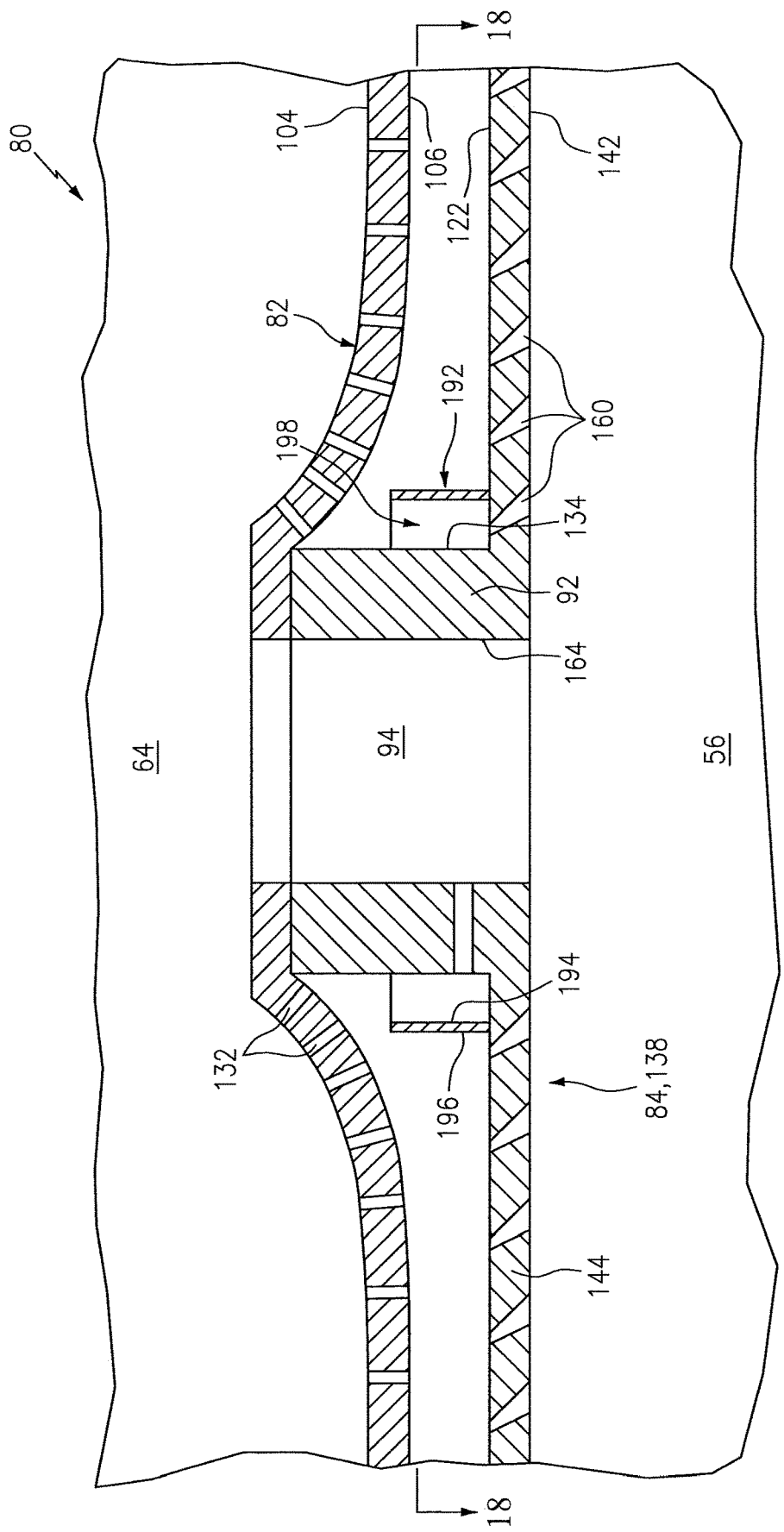
FIG. 17 is a side-sectional illustration of a portion of an alternate embodiment combustor wall.
Figure 18:
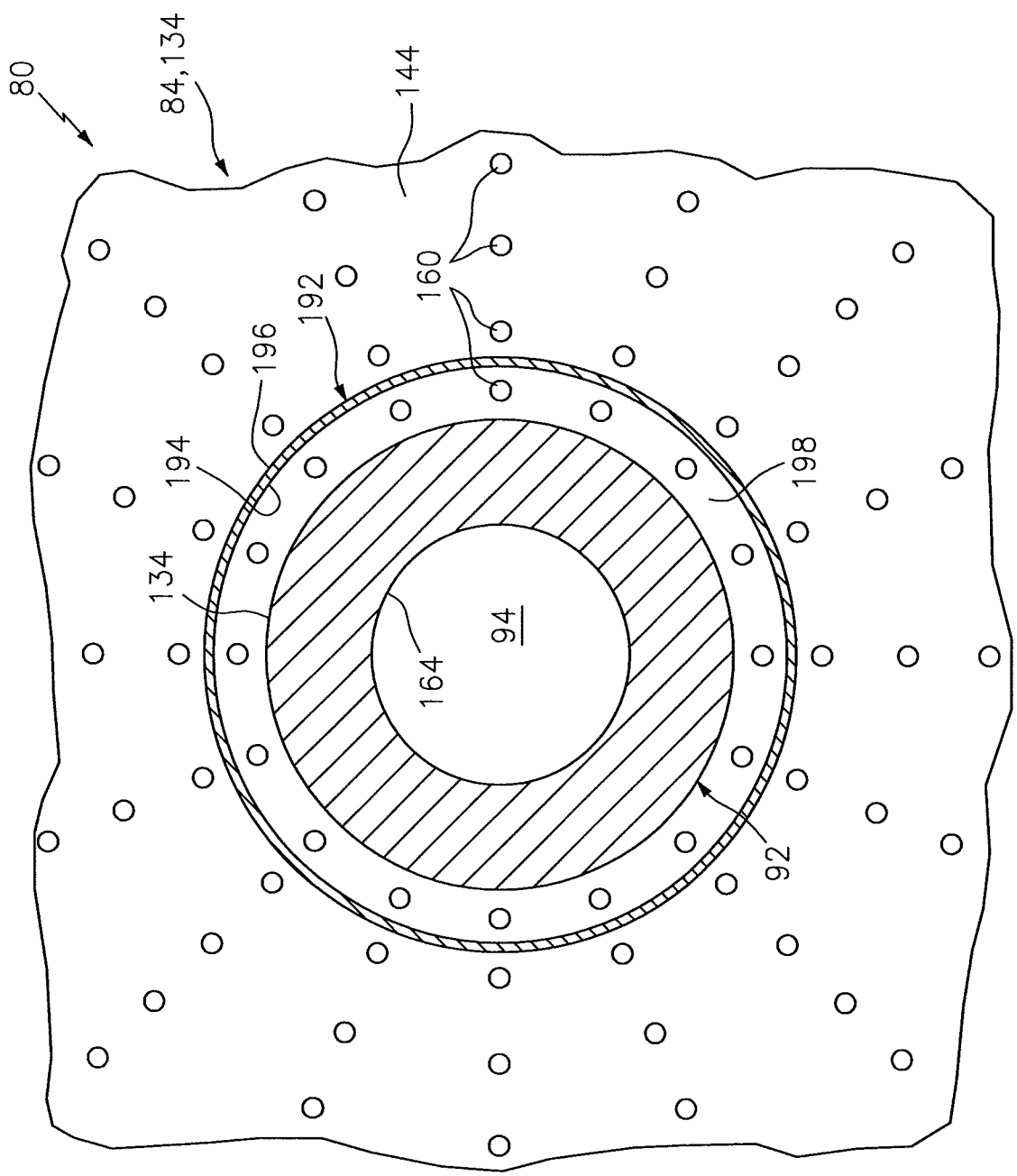
FIG. 18 is a sectional illustration of a portion of the combustor wall of FIG. 17.

In some embodiments, referring to FIGS. 17 and 18, the combustor wall 80 may include one or more sleeves 192. Each sleeve 192 may be formed integral with or attached to the panel base 144 of a respective one the panels 138. Each sleeve 192 extends around a respective one of the igniter aperture bodies 92. Each sleeve 192 extends vertically from the panel base 144 partially towards (or alternatively completely to) the shell 82. Each sleeve 192 extends laterally between an inner surface 194 and an outer surface 196. The sleeve inner surface 194 and the body outer surface 196 may define a spatial annular gap 198 (e.g., an air gap) laterally between the sleeve 192 and the igniter aperture body 92. During turbine engine operation, cooling air may flow into and accumulate within the gap 198 and thereby increase cooling of the igniter aperture body 92 and/or an adjacent portion of the panel 138. This cooling air may subsequently be directed into the combustion chamber 56 to film cool the heat shield 84 through one or more of the cooling apertures 160 fluidly coupled with the gap 198; e.g., cooling apertures 160 with inlets laterally between the sleeve 192 and the igniter aperture body 92.

The terms "forward", "aft", "inner", "outer", "radial", "circumferential" and "axial" are used to orientate the components of the turbine engine assembly 60 and the combustor 62 described above relative to the turbine engine 20 and its centerline 22. One or more of these turbine engine components, however, may be utilized in other orientations than those described above. The present invention therefore is not limited to any particular spatial orientations.

The turbine engine assembly 60 may be included in various turbine engines other than the one described above. The turbine engine assembly 60, for example, may be included in a geared turbine engine where a gear train connects one or more shafts to one or more rotors in a fan section, a compressor section and/or any other engine section. Alternatively, the turbine engine assembly 60 may be included in a turbine engine configured without a gear train. The turbine engine assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. An igniter aperture body with any of the afore-described configurations, for example, may be arranged with a sleeve. Accordingly, the present invention is not to be restricted except in light of the attached claims and their equivalents.

What is claimed is:

1. An assembly for a turbine engine, the assembly comprising:
    an igniter;
    a combustor wall including a shell, a heat shield attached to the shell, and an annular body extending vertically between the shell and the heat shield, the annular body defining an igniter aperture in the combustor wall that receives the igniter; and
    a mount mounting the igniter to the combustor wall;
    wherein a funnel shaped portion of the shell extends circumferentially around the annular body and defines a cooling aperture that is fluidly coupled with a cooling cavity vertically between the shell and the heat shield;
    wherein the annular body has a distal end surface, the annular body extends vertically from the heat shield to the distal end surface, and the distal end surface contacts and forms a seal with an interior surface of the shell that faces the heat shield.

2. The assembly of claim 1, where the funnel shaped portion of the shell is adapted to direct a jet of cooling air through the cooling aperture and into the cooling cavity to impinge against the annular body.

* * * * *